United States Patent [19]
Sitbon et al.

[11] Patent Number: 5,826,088
[45] Date of Patent: Oct. 20, 1998

[54] SYSTEM FOR PROTECTING COMPUTER SOFTWARE WRITTEN IN INTERPRETED LANGUAGE

[75] Inventors: Gérard Sitbon, Vitry; Daniel Gobert, Chilly Mazarin; Christian Baillif, Bourg la Reine; François Urbain, Paris, all of France

[73] Assignee: Bull S.A., Louveciennes, France

[21] Appl. No.: 762,002

[22] Filed: Dec. 11, 1996

[30] Foreign Application Priority Data

Dec. 21, 1995 [FR] France .................................. 95 15287

[51] Int. Cl.⁶ ...................................... G06F 9/45
[52] U.S. Cl. .......................... 395/705; 395/703; 395/712; 395/707; 395/708; 395/710; 395/186
[58] Field of Search ..................... 395/705, 703, 395/712, 704, 706–708, 710, 186; 705/14, 26

[56] References Cited

U.S. PATENT DOCUMENTS

| | | | |
|---|---|---|---|
| 5,375,242 | 12/1994 | Kumar et al. .......................... | 395/707 |
| 5,404,528 | 4/1995 | Mahajan ................................. | 395/685 |
| 5,539,907 | 7/1996 | Srivastava et al. .................... | 395/705 |
| 5,606,697 | 2/1997 | Ono ....................................... | 395/707 |
| 5,628,017 | 5/1997 | Kimmerly et al. .................... | 395/704 |

OTHER PUBLICATIONS

Software—Practice and Experience, vol. 16, No. 3, Mar. 1986, ISSN 0038–0644, UK pp. 269–276, XP002013872 Jyrki Katajainen et al: Syntax–directed Compression of Program Files; abstract; p. 270, line 5—line 42; figures 1,2.
ACM Transactions on Computer Systems, vol, 5, No. 4, Nov. 1987, ISSN 0734–2071, US, pp. 371–393, XP002013873 Amir Herzberg et al.: Public Protection of Software—entire document.
Software—Practice and Experience, vol. 18, No. 6, Jun. 1988, ISSN 0038–0644, UK, pp. 509–527, XP002013874 Frank G. Pagan: Converting Interpreters into Compliers—abstract—p. 521; figures 8,9.

*Primary Examiner*—Emanuel Todd Voeltz
*Assistant Examiner*—Tuan Q. Dam
*Attorney, Agent, or Firm*—Kerkam, Stowell, Kondracki & Clarke, P.C.; Edward J. Kondracki

[57] ABSTRACT

A process for protecting software written for a computer (ORD) in interpreted language, in which the program is written in uncoded form in a script file (FSI), and a compiled code (EXECI) is generated from the content of this file (FSI). This compiled code (EXECI) is then executed, which creates a pipeline (PI) for communicating with an interpreter (INTI) associated with the language used in this file (FSI). The interpreter is supplied through this pipeline (PI), with the content of the initial script file. The interpreter reads the content and executes it in the computer (ORD).

6 Claims, 2 Drawing Sheets

SYSTEM FOR PROTECTING COMPUTER SOFTWARE WRITTEN IN INTERPRETED LANGUAGE

BACKGROUND OF THE INVENTION

1. Field of the Invention

The present invention relates to a process for protecting computer software written in interpreted language and the system for protecting software written in interpreted language which uses it. It is more specifically applicable to the protection of command files containing command scripts, also called "scripts" by one skilled in the art, files which are found in information systems.

2. Description of the Related Art

In current practice, there are two common processes for writing software on a computer, the first of which, called compiled writing, uses a language intended to be compiled, the second of which, called interpreted writing, uses a language intended to be interpreted.

The first process, illustrated by FIG. 1, consists of:
- writing the software in uncoded form in a file FS1 called a "source file", for example in C language, C++, COBOL, FORTRAN, etc.
- submitting the content of this file to a compiler COMP, which translates this software into an instruction set executable by the computer, which set forms a file called a "binary executable file" EXEC,
- loading this set into the random access memory RAM of the computer ORD to be executed by at least one of its processors PROC.

The second process, illustrated by FIG. 2, consists of:
- writing the software in uncoded form in a file called a "script file" FS2, for example in a language such as shell, awk, BASIC, wish, etc., all of which languages are standardized,
- submitting the content of this file to an interpreter INT which reads the instructions in the script file and executes them in the computer.

As compared to the first process, the second offers the following advantages:
- a faster development speed
- easier debugging
- a higher level of programming.

On the other hand, it has the drawback of making available to any user the software manufacturer's script files, which constitute a major human and financial investment on the part of the latter. In effect, the content of these files is uncoded and therefore readable, which means that anyone skilled in the art can understand its semantics by reading its text on any medium whatsoever, for example paper, computer terminal screen, etc.

OBJECT OF THE INVENTION

The object of the invention is to eliminate this drawback by supplying the user not with the script files' but with compiled executable files, without changing either the original script files (which remain with the manufacturer) or the interpreter, which remains available to the client. This is done by inserting between the script files and the interpreter an executable code generator. It is this executable, designed by the manufacture and unreadable in the sense defined above, which is supplied to the user.

SUBJECT OF THE INVENTION

According to the invention, the process for protecting computer software written in interpreted language comprising the following four operations:

Operation 1
The software is written in uncoded form in a file called a "script file", which comprises a plurality of command scripts, also called scripts,
is characterized in that it also comprises the following three operations:

Operation 2
A compiled code, which is not readable from the content of this script file is generated, Operation 3
This complied code is executed, which
 a) creates a communication pipeline with an interpreter which corresponds to the language used in the script file,
 b) through this pipeline, provides this interpreter with the content of the initial script file, Operation 4
This content is read by means of the interpreter, which executes it in the computer.

BRIEF DESCRIPTION OF THE DRAWING

Other characteristics and advantages of the present invention will appear in the following description given as a non-limiting example in reference to the appended drawings. In these drawings.

Figure 1:
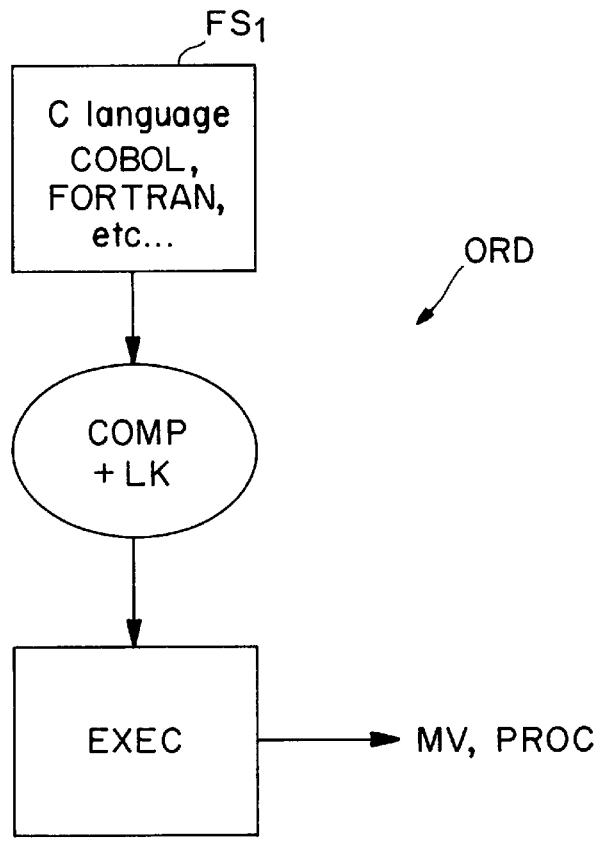
FIG. 1 shows a system for implementing the first programming process according to the prior art.
Figure 2:
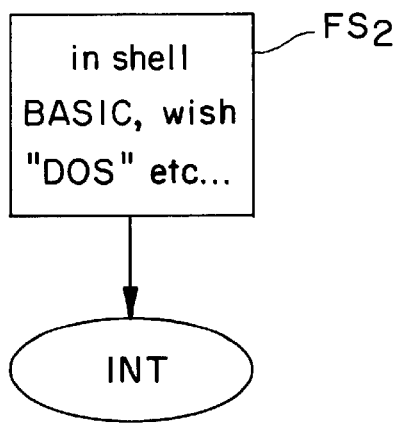
FIG. 2 shows a system for implementing the second programming process according to the prior art.
Figure 3:
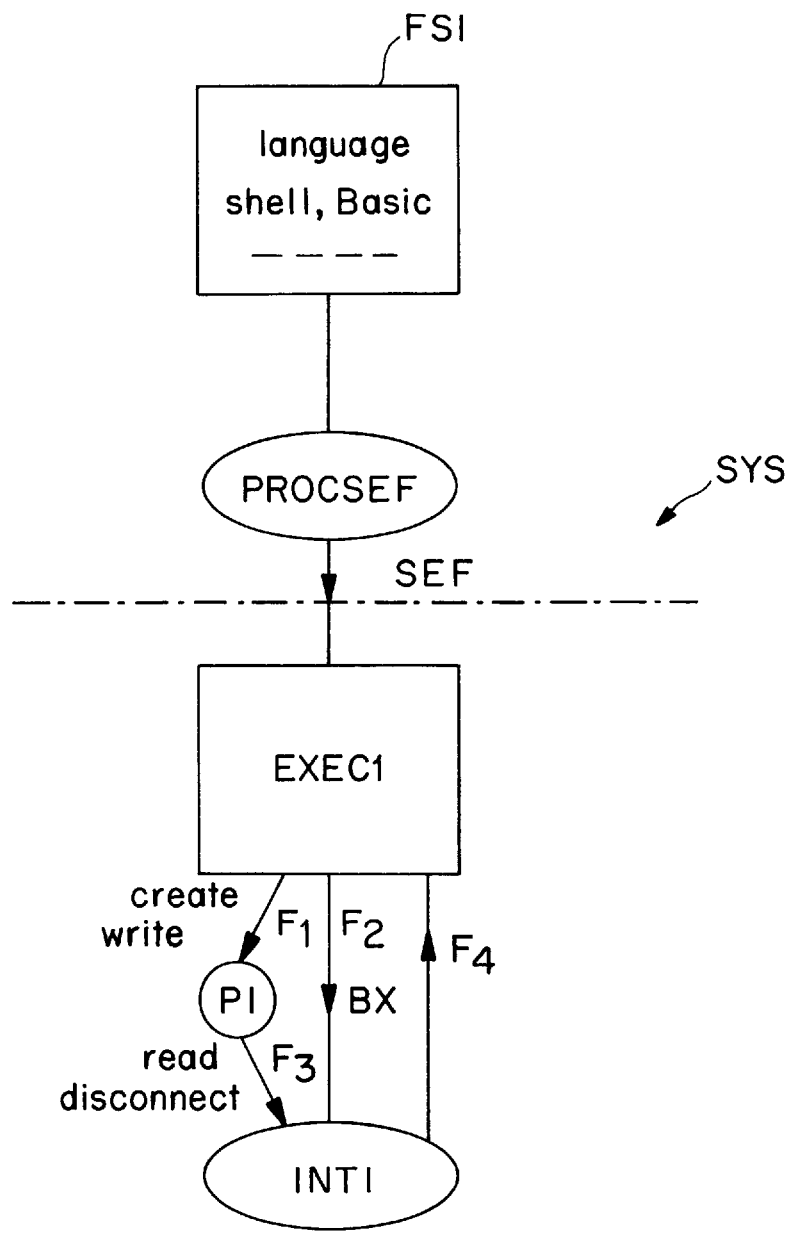
FIG. 3 shows the system which implements the programming process according to the invention.

Refer to FIG. 3.

DESCRIPTION OF THE PREFERRED EMBODIMENTS

The system SYS for implementing the software protection process according to the invention comprises:

- the source file FSI which is a script file of the text type containing commands written in uncoded form, that is, readable by standard editing tools. They are written in a standardized language well-known to one skilled in the art, for example one of the following languages: Shell, BASIC, awk, wish, DOS, etc.
- the processor PROCSEF which transforms the content of the command file FSI into the content of an executable file, thus rendering it unreadable by the known text editing tools such as, for example, vi, more, or strings, which are specific to the UNIX world (standard computer operating system, registered trademark)
- the file EXECI which contains the executable commands resulting from the transformation carried out by the processor PROCSEF
- the command interpreter INTI which is a software program which executes the commands contained in the file EXECI, and is therefore specific to the uncoded language used to write the software.

In practice, the file FSI and the processor PROCSEF remain with the manufacturer and designer of the software and are not made available to the user, who never gains familiarity with them.

However, the file EXECI and the interpreter INTI, which are also designed by the manufacturer, are supplied by the latter to the user.

This separation between FSI-PROCSEF and EXECI-INTI is symbolized by the horizontal dot-and-dash line located in the middle of FIG. 3.

The main lines of the operation of the system SYS correspond to the various steps of the process according to the invention, which are the following:

1) The program is written in uncoded form in the script file FSI using a plurality of ASCII-type commands (shell, awk, etc.). This is carried out by the human operator who is the designer of the program.

2) By means of the processor PROCSEF, which uses for each script a command called SEF which will be explained in detail below, a compiled code is generated which is not readable from the content of this script file. PROCSEF thus transforms each script into what is called a compiled executable, which is constituted by a compiled set of code lines forming the executable EXECI.

3) This compiled code is executed in the following way:
   a) EXECI creates a communication pipeline or channel PI with the interpreter INTI, and
   b) supplies this interpreter, through the pipeline PI, with the content of the initial script file FSI.

4) The interpreter INTI reads this content and executes it in the computer ORD.

The detailed structure of the command SEF is given in Appendix 1. It essentially comprises a first part defining the syntax which must be used throughout this command and a second part defining the various possible options, specifically indicating the name of the interpreter INTI and of the output file EXECI.

From the moment that a command SEF is transmitted to the processor PROCSEF, the general method for transforming uncoded commands into lines of compiled code consists of replacing the words in the command file FSI with references to a catalogue of predefined words.

A compilable program in C language is then generated. This allows all the lines in the file FSI to be formatted and all the words (strings of alphabetical characters) to be converted into references. This program is the one contained in the file EXECI.

During the execution of the compiled program, the content of FSI is first reconstructed in its original form (thus it is clear that, in fact, the uncoded program is contained in the file EXECI, but is rendered invisible to the user), then the various commands contained in it are executed by INTI, since the latter is specific to the uncoded language in which the various commands were written in FSI and therefore understands its instructions.

The generation of the compilable software in C language, which makes it possible to construct the file EXECI and which results from the utilization of the command SEF by PROCSEF, is carried out by the manufacturer.

It comprises the following four steps:

1) Generation of the program lines in C language in order to create two tables:
   the first T1 for containing the various words (character strings) used in the software
   the second T2 for containing the various line format types, each of which includes a determined number of words.

This generation technique is well known to one skilled in the art.

2) For each line of the command program:
   a search for the various words used in the current line.
   each new word is placed in Ti and numbered,
   each new type of line is placed in T2 and numbered,
   construction of the program lines C language using the numbers associated with the type of line and the words in the line.

3) Generation of the program lines in C language, which makes it possible to write in the pipeline PI the software contained in the reconstructed FSI (symbolized by the arrow F1 running from EXECI to PI in FIG. 3) and which is simultaneously accompanied by the following steps:
   authentication and calling of the command interpreter (symbolized by the arrow F2 running from EXEC1 to INTI in FIG. 3),
   wait for the end of the execution of the script through return of the status information indicating this end (symbolized by the arrow F4, running from INTI to EXECI in FIG. 3), 4) Compilation of the program lines in C language.

The command SEF returns various types of messages to the processor PROCSEF. These messages, which are indicated in Appendix 2, are the following:

error messages, which indicate improper use of the command SEF, warning messages, which indicate that certain precautions must be taken at the level of the command, internal error messages, which indicate improper operation of the command SEF. The error file generated in this case will be useful for analyzing the problem.

Once any script is transformed using a command SEF and a compiled executable, its execution proceeds in the following way. It comprises four operations:

A) the executable EXECI creates the communication channel PI with INTI, assigning it a determined name, B) it authenticates INTI, for example by means of a signature system known to one skilled in the art by the English word "checksum", and activates it, giving it the name of the channel PI as a parameter, C) it transmits the script to INTI through the channel PI (arrow F3 in FIG. 3), D) it waits for the end of the execution of the script by INTI, destroys the channel PI and terminates the execution upon reception of the execution status of the script (arrow F4).

Depending on the quality of the operation of the system SYS, error messages, given in Appendix 2, are returned to the software user during the execution of the script by EXECI, for example through the standard error output (stderr) if using the UNIX standard. The field <reason> is a message describing the error encountered. This message is supplied by the computer ORD to the user.

While a preferred embodiment of the invention has been illustrated and described, it will be apparent to those of ordinary skill in the art that various changes and modifications may be made without deviating from the inventive concept and spirit of the invention as set forth above, and it is intended by the appended claims to define all forms of the invention which come within the full scope and true spirit of the invention.

APPENDIX 1

STRUCTURE OF THE COMMAND SEF seff [-h] [-f] [-c interpreter] [-o output_file] file
the option -h- is used to display the syntax of the command
the option -f- is used to filter the lines of commentary and the empty lines of the input file FSI,
the option -c- is used to specify the name of the interpreter INTI,

APPENDIX 1-continued

STRUCTURE OF THE COMMAND SEF the option -o- is used to specify the name of the output file EXECI.

APPENDIX 2

Messages returned by the command SEF:

error messages

The option -o is used, but is not followed by the name of the output file.
The option -c is used, but is not followed by the name of the interpreter.
<option>: this option is not valid.
The names of the input and output files must be different.
The name of the input file is not indicated.
<file>: this input file must be a text or command file.
<file>: this input file is not a file.
<interpreter>: this interpreter is not supported.
Too many parameters.

warning messages

Attention: <number> lines of commentary have been found in the input file.
Attention: the use of dirname is limited.
Attention: the interpreter ksh will be used by default.
Attention: the interpreter <interpreter> is specified in the first line of the input file FSI.
Attention: the parameters <parameters> are not recognized.
Attention: please be patient for about <minutes> minutes.

internal error messages

Internal error: the compilation has failed.
See the error file: <file>
Internal error: the original file and the file generated are different.
See the error file: <file>
Internal error: the command awk has failed.
See the error file: <file>

Messages returned during the execution of the file EXECI sef:authentication:<reason>
the interpreter is not recognized as the interpreter before executing the script FSI
sef:execution:<reason>
impossible to activate the interpreter INTI
sef:lecture<reason>
impossible to read the communication pipeline PI
sef:creation:<reason>
impossible to create the communication pipeline PI we claim:

1. A system for protecting software written in interpreted language which uses a process for protecting software for computer (ORD) written in interpreted language comprising:
   a source command file (FSI) which is a script file containing commands (scripts) written in uncoded form readable by standard editing tools,
   a processor (PROCSEF) for transforming the content of the command file (FSI) into the content of an executable file, thus rendering it unreadable by the known text editing tools,
   an executable file (EXECI) containing the executable commands resulting from the transformation carried out by the processor (PROCSEF), and
   a command interpreter (INTI) software program for executing the commands contained in the executable file (EXECI), said program being specific to the uncoded language used to write the software.

2. The system for protecting software written in interpreted language according to claim 1, characterized in that the processor transforms the content of the command file into the content of an executable file by means of a special command (SEF) comprising a first part defining a syntax which must be used throughout said command and a second part defining various options, and specifically indicating the name of the interpreter (INTI) and of the output file (EXECI).

3. A process for protecting software for a computer (ORD), written in interpreted language, comprising first, second, third and fourth operations, wherein in writing software in uncoded form in a file (FSI) called a "script file", (FSI) to provide certain content which comprises a plurality of command scripts;
   generating a compiled code (EXECI), which is not readable from the content of said script file (FSI),
   executing on the compiled code (EXECI) to create a communication pipeline (PI) with an interpreter (INTI) associated with the language used in the script file,
   providing said interpreter with the content of the initial script file through said pipeline (PI), and
   reading the content by means of the interpreter, which executes it in the computer (ORD).

4. The process according to claim 3, characterized in that the generation of the compiled code (EXECI) comprises the following four steps to generate a command program in C language :
   Step 1: generation of program lines in C language in order to create two tables:
      a first table T1 for containing various words (character strings) used in the software,
      a second table T2 for containing various line format types, each of which includes a determined number of words.
   Step 2: For each line of a command program:
      searching for the various words used in the current line,
      placing and numbering each new word in table T1,
      placing and numbering each new type of line in table T2,
      constructing program lines in C language using the numbers associated with the type of line and the words in the line.
   Step 3: generating the program lines in C language, to make it possible to write in pipeline PI the software contained in the reconstructed file FSI,
   Step 4: compiling of program said program lines in C language.

5. The process according to claim 4 characterized in that Step 3 is simultaneously accompanied by the following steps:
   authentication and calling of the command interpreter (INTI), and
   waiting for the end of the execution of the script through return of the status information indicating said end which issues from the executable file (EXECI).

6. The process according to claim 3, characterized in that during Step 3, the executable file (EXECI) creates the communication pipeline (PI), assigning it a determined name, authenticates the interpreter (INTI), and activates it, giving it the name of the pipeline (PI) as a parameter, and during waiting for the end of the execution of the script, the executable file (EXECI) transmits the script to the interpreter (INTI) through the pipeline (PI), and waits for the end of the execution of the script by the interpreter (INTI) after which the pipeline (PI) is destroyed and the execution is terminated upon reception of the execution status of the script.

* * * * *